W. S. BARNICKEL.
APPARATUS FOR TREATING NATURAL OILS AND RESIDUES OF SAME.
APPLICATION FILED MAR. 6, 1916.
1,223,660.
Patented Apr. 24, 1917.
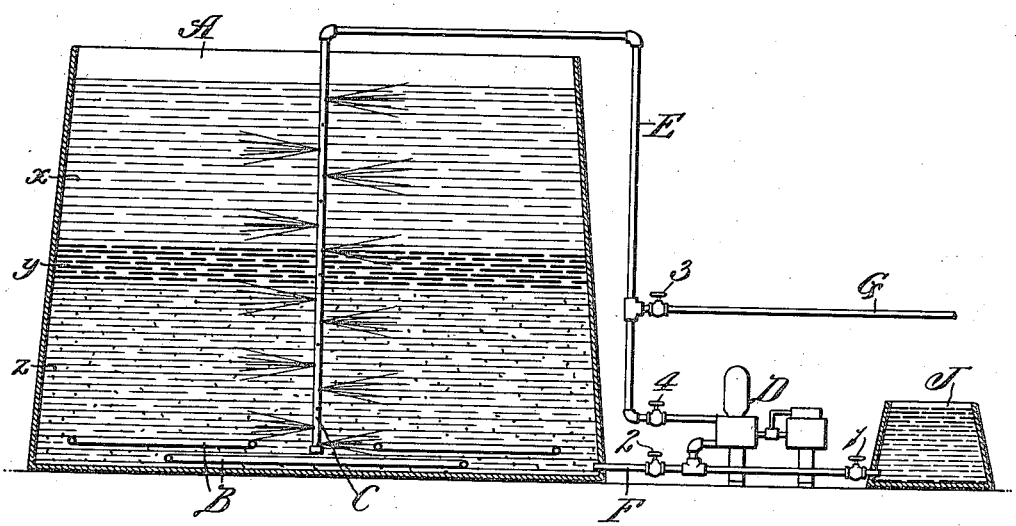
Inventor,
William S. Barnickel.
By Bakewell & Cornwell Attys.

UNITED STATES PATENT OFFICE.

WILLIAM S. BARNICKEL, OF ST. LOUIS, MISSOURI.

APPARATUS FOR TREATING NATURAL OILS AND RESIDUES OF SAME.

1,223,660.  Specification of Letters Patent.  Patented Apr. 24, 1917.

Original application filed November 19, 1914, Serial No. 873,061. Divided and this application filed March 6, 1916. Serial No. 82,462.

*To all whom it may concern:*

Be it known that I, WILLIAM S. BARNICKEL, a citizen of the United States, residing at St. Louis, Missouri, have invented a certain new and useful Improvement in Apparatus for Treating Natural Oils and Residues of Same, of which the following is a full, clear, and exact description, such as will enable others skilled in the art to which it appertains to make and use the same.

This invention relates to an apparatus for treating natural oils and residues of same, and is a division of my co-pending application Serial No. 873,061, filed November 19, 1914.

A large amount of crude oil, when produced from the ground, contains a small percentage of foreign matter which has found its way into the oil-bearing strata and wells. Crude oil is usually stored in large earthen or steel storage tanks, and when it is left standing for some time a thick viscous brown substance known as "bottom settlings" settles out of the petroleum to the bottom of the tank and remains therein as a residue when the petroleum is drawn off. This residue or bottom settlings, when examined under a microscope, appears to be an emulsion consisting of a high per cent. of petroleum, organic matter, brine and sometimes mud, and in the oil fields and tank farms large amounts of these bottom settlings have accumulated, as it is unfit for use and cannot be gotten rid of by allowing it to run into a flowing stream or river, as the laws of some States prohibit this, on account of the noxious nature of the settlings. It frequently happens that a well will produce oil, which, as it flows from the well is so mixed with the substances that constitute bottom settlings, that the oil is unfit for use, and in the oil fields is known as "roily oil", this roily oil being essentially similar in nature and consistency to bottom settlings.

In my co-pending application above referred to I have described a novel process for separating practically all of the petroleum contained in bottom settlings and roily oil, and rendering such petroleum suitable for commercial use. The object of my present invention is to provide an apparatus for practising the said process, which apparatus can also be used for treating crude oils that contain a relatively small percentage of foreign matter.

Briefly described, the process described in my application above referred to consists in treating bottom settlings, roily oil or any other natural oils or residues of same of a similar nature with a water-softening agent, namely, an agent which partially or completely removes the hardness of the water contained in the bottom settlings or roily oil by decomposing the salts of lime and magnesia which are held in solution in the water, and thereby softening the water or brine, thus changing the composition of the mineral salts and isolating the foreign organic matter and leaving the oil free to separate from the water and foreign matter in the natural way, by gravity. The water-softening agent above referred to is preferably introduced into the mixture being treated in solution and under pressure, so as to distribute said agent thoroughly through the mixture and cause every portion of the mass to be brought in contact with the water-softening agent, thereby resulting in breaking up the emulsion. It is also preferable to apply heat to the mixture or to the water-softening agent before, during or after the mixing. Any suitable water-softening agent can be used, such, for example, as soluble sulfate alone or soluble carbonates alone, or soluble carbonates, silicates and sulfates mixed and made sufficiently alkaline by the addition of a soluble hydrate, soluble soaps alone, or soluble soaps, carbonates and silicates mixed, or oleic acid alone when the brine contains alkaline carbonates in solution, or oleic acid, rosin or the fatty substances from which soaps are made added when the brine of the bottom settlings or roily oil contains alkaline carbonates in solution or has been made alkaline by the addition of a soluble hydrate or carbonate thereto, as may be required for the particular bottom settlings or roily oil which is to be treated. The oil, organic matter and brine of the bottom settlings and roily oil differ somewhat in composition in different localities, so I prefer, in some cases, to use carbonate of soda for treating very old bottom settlings of many years' standing, on account of economy and ease of handling, and a soap made of oleic acid and caustic soda, for treating roily oil of recent production. And in some cases I have found that a soluble sulfate alone or a mixture of sulfate, carbonate and silicate of soda, or sulfate of soda, made sufficiently alkaline with caustic soda, will treat equally well.

The figure of the drawings is a diagrammatic view, illustrating an apparatus constructed in accordance with my invention.

In practising the process I intimately mix with the bottom settlings, or roily oil being treated, a sufficient quantity of carbonate of soda or other suitable water-softening agent, preferably dissolved in water, and heat the mixed mass, usually from 110 to 200 degrees Fahrenheit, until the mass is treated, which is seen by the mass darkening throughout. Usually from 1 to 4 barrels of carbonate of soda is sufficient for 1000 barrels of bottom settlings of long standing, and one-half to one barrel of the oleic acid soap, or other suitable water-softening agent, for 1000 barrels of bottom settlings or roily oil of recent production. Upon standing, the petroleum, which is usually from 30 to 60 per cent. of the total bulk, rises to the top, the brine and mud, if any mud is present, settling to the bottom of the tank and the organic matter forming a thin layer between the brine and the petroleum. Thereafter, the mud and brine and the organic matter are drawn off, leaving the petroleum in a marketable condition so that it can be used for fuel or for refining. While I prefer to introduce a water-softening agent into the mixture being treated in a liquid state and under pressure, I have found that when carbonate of soda or any other suitable water-softening agent, either dry or dissolved in water, is allowed to remain in contact with bottom settlings or roily oil, either after warming or not, it will gradually bring about the separation of the petroleum.

Referring to the drawing which illustrates the said apparatus, A designates a tank or container for holding the bottom settlings or roily oil, hereinafter referred to as "the mixture which is to be treated". The mixture in the tank A is heated to the desired temperature by means of a steam coil or steam coils B arranged inside of the tank adjacent the bottom of same, and a solution of carbonate of soda or other suitable water-softening agent is introduced into the mixture in the tank A by means of a perforated pipe C, said solution of carbonate of soda being drawn out of a supply tank J and forced under pressure through the pipe E to the perforated pipe C by means of a pump D, said pipe E being provided with a controlling valve 4. The chemical solution settles to the bottom of the tank A, carrying with it the brine which has separated from the portions of the bottom settlings or roily oil with which the chemical solution has come in contact. After the supply of chemical solution from the supply tank J has been consumed the valve 1 in the pipe that leads from said supply tank J to the suction side of the pump is closed and the valve 2 in the pipe F that leads from the tank A to the suction side of the pump is opened, so as to cause the chemical solution that has settled to the bottom of the tank A to be drawn out of said tank and pumped up through the pipe E to the perforated pipe C, the mixing being continued for several hours by causing the heated chemical solution to circulate from the bottom of the tank A through the pump and pipe E back to the perforated pipe C. In view of the fact that the chemical solution is under considerable pressure, it will squirt in small streams through the orifices in the pipe C into the mixture in the tank A, thereby causing the chemical solution to come in contact with every portion of the mixture in the tank A. After this operation has been carried on a sufficient length of time to cause the emulsion to break, which is seen by the mass becoming black or dark green on top and the change throughout the mass from a thick viscous to a thin water-like consistency, the supply of steam to the coil B is cut off and the pump D is also stopped. The mass in the tank A is then allowed to stand for from twelve to twenty-four hours, when the petroleum $x$ will have risen to the top, the brine and mud $z$ settle to the bottom and the organic matter $y$ will have formed a thin layer between the petroleum and the mud and brine, as indicated in the drawing.

Instead of applying the heat by a coil arranged inside of the tank A, the heat can be applied by any suitable means, as, for example, by blowing live steam directly into the mixture in the tank A through the perforated pipe C, the apparatus herein shown being equipped with a steam supply pipe G connected with the pipe E and provided with a controlling valve 3.

While the apparatus illustrated in the drawing is designed primarily for practising the process described in my co-pending application previously referred to, said apparatus is also capable of being used successfully for various other purposes. It is particularly adapted for use in washing crude oil that contains only a small percentage of foreign matter, and when used for this purpose, the container J will be filled with water, instead of with a chemical solution. The purpose of using the chemical solution or treating liquid over and over again, or, in other words, causing it to circulate from the bottom of the tank A back to the device C which introduces it into the material in the tank A, is merely for the sake of economy. Therefore, I do not wish it to be understood that my present invention is limited to an apparatus comprising means for utilizing the treating liquid that has settled to the bottom of the tank in which the material is contained while it is being treated, as the treating liquid may be drawn from a fresh supply, or the treating liquid that has settled to the bottom of one tank A can be introduced into another tank containing a batch of material that is being treated. It is also immaterial what means is employed for introducing the treating liquid into the mixture or material being treated, so long as said means is of such a character that it will result in the treating liquid being distributed thoroughly through the material and brought in contact with all portions of same.

Having thus described my invention, what I claim, and desire to secure by Letters Patent, is:

1. An apparatus for treating natural oils and residues from same, comprising a tank or receptacle having an unobstructed interior, said tank being adapted to hold the material to be treated, means for introducing a solution containing a water-softening agent into the material in said tank in the form of fine jets or sprays that are discharged approximately horizontally through the material at innumerable points between the top surface of the material and the bottom of the tank, thereby causing every portion of the mass in said tank to be brought in contact with the water-softening agent in said solution, and means whereby the solution that settles to the bottom of the tank may be again introduced into the material in said tank in the same manner previously specified.

2. An apparatus for treating natural oils and residues from same, comprising a tank or receptacle that has an unobstructed interior, said tank being adapted to hold the material to be treated, means for heating the material in said tank, and means for introducing a solution containing a water-softening agent into the material in said tank in the form of fine jets or sprays that squirt horizontally through said material from a point at the center of the tank toward the side walls thereof, thereby causing the water-softening agent in said solution to come in contact with all portions of the mass in the tank.

3. An apparatus for the purpose described, consisting of a tank for holding the material to be treated, a small container for holding a chemical-treating solution, a perforated injecting device immersed in the material in said tank, a pump for drawing the treating solution from said container and forcing it into said injecting device, and means for causing the pump to draw the chemical-treating solution out of the bottom of said tank and force it into said injecting device after the contents of said chemical solution container has been exhausted.

4. An apparatus of the character described, comprising a tank for holding material that is to be treated, an injecting device arranged in an upright position in the material in said tank and provided with side orifices at innumerable points intermediate the ends of same, means for supplying a water-softening agent to said device under pressure, a steam supply pipe, and means whereby communication between said steam supply pipe and said injecting device can be established and cut off at the will of the operator in charge of the apparatus.

5. An apparatus of the character described, comprising a tank for holding material that is to be treated, an injecting device immersed in the material in said tank, a pump having its discharge side connected with said device, a container for holding a liquid which it is desired to distribute thoroughly through said material, and means for establishing communication between the suction side of said pump and said tank or container at the will of the operator in charge of the apparatus.

6. An apparatus of the character described, comprising a tank for holding material that is to be treated, an injecting device immersed in the material in said tank, a pump having its discharge side connected with said device, a container for holding a liquid which it is desired to distribute thoroughly through said material, conduits leading from said container and from the lower end of said tank to the suction side of said pump, means whereby either of said conduits may be cut out of service, and means for heating the material in said tank.

In testimony whereof I hereunto affix my signature, in the presence of two witnesses, this second day of March, 1916.

WILLIAM S. BARNICKEL.

Witnesses:
 WELLS L. CHURCH,
 GEORGE BAKEWELL.